US006383397B1

(12) United States Patent
Kojima

(10) Patent No.: US 6,383,397 B1
(45) Date of Patent: May 7, 2002

(54) METHOD FOR SEPARATING MAGNETIC PARTICLES MIXED IN FLUID, SEPARATING SYSTEM, AND SEPARATOR

(76) Inventor: Haruo Kojima, 970-6, Izumichoootomi, Toki-shi, Gifu 509-5132 (JP)

( * ) Notice: Subject to any disclaimer, the term of this patent is extended or adjusted under 35 U.S.C. 154(b) by 0 days.

(21) Appl. No.: 09/673,380

(22) PCT Filed: Apr. 16, 1999

(86) PCT No.: PCT/JP99/02033

§ 371 Date: Dec. 11, 2000

§ 102(e) Date: Dec. 11, 2000

(87) PCT Pub. No.: WO99/54050

PCT Pub. Date: Oct. 28, 1999

(30) Foreign Application Priority Data

Apr. 16, 1998 (JP) .......................................... 10-106409
Feb. 8, 1999 (JP) .......................................... 11-030419

(51) Int. Cl.[7] ........................... B01D 35/06; B03C 1/00

(52) U.S. Cl. ....................... 210/695; 210/222; 210/223; 210/323.2; 210/324; 210/330; 209/223.1; 209/232

(58) Field of Search ................................ 210/222, 695, 210/223, 323.2, 324, 330; 209/223.1, 232

(56) References Cited

U.S. PATENT DOCUMENTS 4,244,822 A * 1/1981 Slavens ...................... 210/222

FOREIGN PATENT DOCUMENTS

| | | |
|---|---|---|
| JP | 59-012722 | 1/1984 |
| JP | 63-044912 | 2/1988 |
| JP | 03-501097 | 3/1991 |
| JP | 09-024222 | 1/1997 |

* cited by examiner

*Primary Examiner*—David A. Reifsnyder
(74) *Attorney, Agent, or Firm*—Wenderoth, Lind & Ponack, L.L.P.

(57) ABSTRACT

A method for separating magnetic particles dispersed in a fluid by magnetic attraction, characterized in that an object fluid in which magnetic particles are dispersed is passed through a magnetized rotary tube, magnetic particles are made to adhere by magnetic attraction to magnetized surface in the tube, the flow of the fluid is suspended before the capacity of magnetic attraction of the tube lowers, the magnetized surface is demagnetized, an exhaust fluid for exhausting magnetic particles in the tube is made to flow under pressure through the tube, the exhaust fluid mixed with magnetic particles is discharged, and the magnetic particles are separated from the exhaust fluid.

7 Claims, 12 Drawing Sheets

METHOD FOR SEPARATING MAGNETIC PARTICLES MIXED IN FLUID, SEPARATING SYSTEM, AND SEPARATOR

BACKGROUND OF THE INVENTION

1. Field of the Invention

The present invention relates to a method for separating magnetic particles mixed in a fluid by making use of the action of magnetic attraction, wherein the method includes causing the magnetic particles dispersed in an original fluid such as liquid or gas to be attached magnetically by the magnetic attraction, and separating those magnetic particles from the fluid. The present invention also provides a separating system and a separator that attract the magnetic particles in the fluid magnetically and separates them from the fluid by operating in accordance with the steps of such method.

2. Prior Art

There is a conventional separator that is used to separate ferromagnetic metals by attracting the metals in a particular object such as a fluid magnetically and separating them from the object.

It is also known that even for certain magnetic substances, other than the ferromagnetic substances, that possess less magnetization when placed in a magnetic field (referred hereinafter to as "less magnetic substances" or "less magnetic particles"), they may be attracted magnetically and separated if the magnetic force that is applied is increased. A process is also proposed, which deals with fine white day, such as kaolin, whose composition contains magnetic impurities, and allows those magnetic impurities to be removed by making use of the energy of the applied magnetic field (as disclosed in Japanese patent Publication No. 63- 95908).

In the mineral dressing field where foreign ferromagnetic substances or elements contained in a particular mineral and that should be removed are attracted magnetically and separated from the mineral, or in the field where foreign ferromagnetic objects such as works are attracted magnetically and separated from objects such as works being processed, there is a process that is used to separate those foreign substances or elements, or works by separating them by attracting them magnetically. In this process, the separation occurs by making one side of an electromagnet in contact with objects being processed, thereby magnetizing and attracting any foreign objects magnetically, and then rotating the electromagnet to demagnetize the magnetically attracted portions of those objects. However, this process is primarily designed to separate the foreign ferromagnetic substances or elements, or works, by the magnetic attraction, and is not suitable for use in separating less magnetic substances or elements, or works, that possess less magnetization when placed in a certain magnetic field. The process as mentioned above that utilizes the energy of the normal magnetic field to process the kaolin composition cannot be used for separating any less magnetic substances or elements.

Those less magnetic substances or elements require a powerful magnetic force (or example, 1000 Gauss or more) to be magnetized and attracted magnetically, and the substances or elements that have thus been magnetized and attracted must be removed before they become saturated magnetically. When a powerful magnetic force is applied, it is difficult to remove the residual magnetism that remains in the magnetized substances or elements, shortly after the magnetic field is removed by cutting the electrical current. Thus, this process has several problems in that it cannot be utilized for the industrial applications. For example, even when the less magnetic substances or elements are magnetized and attracted by applying the powerful magnetic force of 1000 Gauss or more across them, if there are any less magnetic substances or elements that are attached to the magnetized surface, other less magnetic substances or elements that make contact with those less magnetic substances or elements will not be magnetized and attracted, and will be allowed to flow away without being attracted magnetically at all. Thus, this process is not efficient in separating the less magnetic substances or elements. This problem may be solved if the less magnetic substances or elements that have been magnetized and attached by the magnetic attraction are to be removed frequently. It is difficult to remove those substances or elements in a short time, however, because the residual magnetism remains in them. Accordingly, the separating process must be suspended until the residual magnetism disappears, each time the substances or elements that are attached by the magnetic attraction are to be removed completely. This prevents the efficient separation.

SUMMARY OF THE INVENTION

The present invention solves the aforementioned problems of the prior art by providing a method for separating magnetic particles in a fluid, which comprises the steps of feeding an original fluid containing magnetic particles dispersed therein into a magnetized tube as an object being processed (referred hereinafter to as "object fluid"), rotating the magnetized tube, adding free ferromagnetic elements into the tube as required to increase the effective magnetized surfaces within the tube, thereby making effective use of the magnetized surfaces, attracting the magnetic particles magnetically to the magnetized surfaces, demagnetizing the magnetized surfaces before they reach their magnetic saturation, feeding an exhaust fluid into the tube, and removing the magnetically attracted magnetic particles from the demagnetized surfaces by carrying them with the exhaust fluid. According to the method, several magnetized tubes may be provided in parallel, and those individual tubes may be operated so that the magnetic attraction of the magnetic particles and the removal of the magnetic particles thus attracted magnetically can occur alternately for each individual tube. In this way, at least any one of those tubes may be kept running at any time without having to discontinue the separating process, and the separating efficiency may be improved accordingly.

In one aspect of the present invention, a method is provided for separating magnetic particles, which includes the steps of feeding an original fluid containing magnetic particles dispersed therein into a magnetized tube as an object being processed (also called "object fluid"), allowing the magnetic particles in the object fluid to be attached to the magnetized surfaces within the tube by the magnetic attraction, and removing the magnetic particles from the magnetized surfaces by demagnetizing the tube, wherein the method is characterized by the fact that the magnetic attraction of the magnetic particles to the magnetized surfaces within the tube occurs by rotating the tube.

In another aspect of the present invention, a method is provided for separating magnetic particles, which includes the steps of feeding an original fluid containing magnetic particles dispersed therein into a magnetized rotary tube as an object being processed (also called "object fluid"), allowing the magnetic particles in the object fluid to be attracted magnetically to the magnetized surfaces within the tube, suspending the feeding of the object fluid before the magnetic attracting capability of the magnetized surfaces within the tube becomes lower below a certain value, demagnetizing the magnetized surfaces within the tube, feeding an exhaust fluid into the tube under the applied pressure for carrying the detached magnetic particles therewith, removing the magnetic particles together with the exhaust fluid from the tube, and separating the magnetic particles from the exhaust fluid that contained the magnetic particles therein. In this case, the exhaust fluid may be clean water or air, and may be fed into the tube in the direction opposite to that in which object fluid is fed. The surfaces being magnetized may include both the inner wall of the tube and the surfaces of the free ferromagnetic substances or elements that may be added as required into the tube.

In a further aspect of the present invention, a system is provided for separating magnetic particles mixed into an original fluid, which comprises means for crashing an original object into fine particles, if the object is in its solid form and then dispersing the fine particles in water or other fluid, means for adjusting the density of an original object to an appropriate level if the object is originally a fluid, means for feeding either of the resulting object fluids into a magnetized rotary tube as an object being processed (also called "object fluid"), means for allowing the magnetic particles contained in the object fluid to be attracted magnetically to the magnetized surfaces within the tube, means for demagnetizing the magnetized surfaces within the tube, means for feeding an exhaust fluid under the applied pressure into the tube for carrying the detached magnetic particles therewith, means for removing the detached magnetic particles together with the exhaust fluid from the tube, and means for separating the magnetic particles from the exhaust fluid. The tube may be divided into several tube sections, each of which may provide a magnetic force of different strength. Specifically, the strength of the magnetic force may be increasing gradually from the tube section located on the inlet side of the tube toward the tube section located on the outlet side. In other words, the strength is the smallest at the inlet side section, and is the greatest at the outlet section. The exhaust fluid may be clean water or air, or combination of both. The rotary tube may be a round tube, to which mechanical means for rotating the tube may be connected.

In still another aspect of the present invention, an apparatus is provided for separating magnetic particles mixed into a fluid, which includes a plurality of tubes arranged in parallel on a machine base, each of the tubes is rotatably connected on its one end to a feed pipe for feeding an original fluid containing magnetic particle into each respective tube as an object being processed (referred hereafter to as "object fluid"). And each of the tubes is rotatably connected on its other end to a delivery pipe for removing the object fluid from which the magnetic particles have been separated. A pressurized fluid delivery pipe connected to the outlet pipe via a check valve, a further pressurized fluid delivery pipe connected to the above pressurized fluid delivery pipe for delivering a different pressurized fluid, an outlet pipe connected to the above inlet delivery pipe via a control valve for discharging the magnetic particles separated from the fluid carrying the magnetic particles therewith, and means for rotating the rotary tube. Each of the tubes includes a plurality of tube sections connected in series, each of which has a magnetizing coil winding around the outer periphery thereof. A control device is coupled with each of those magnetizing coil windings for controlling the strength of the magnetic force provided by the magnetizing coil winding. The free ferromagnetic substances or elements may be iron or iron alloy, which may be formed into small pieces having the rugged surfaces. The quantity of those small pieces to be fed into the tube sections may be controlled so that the apparent quantity can be equal to any value between 30% and 90% of the total volume of the tube sections. The number of the parallel tubes may be two, four, or six, depending on the particular requirements.

The electrical current that can flow through each coil winding that act as an electromagnet is preferably DC current, which is preferably supplied from any voltage-controlled power supply. The fluid that may be used for the purposes of the present invention is usually liquid (water) for the easiness in handling. When an original fluid being processed is any gas (such as exhaust gas produced by burning), the separation may occur directly from the gas. In this case, air is often used as the pressurized exhaust fluid, but in some cases, water or any liquid containing any medicine may also be used.

Most commonly, the tube may be a round tube, but instead of the round pipe, other shapes such as elliptical may be used. The choice should be made by taking into account the fact that the tube rotates. For example, a tube having a particular shape in cross section, such as annular corrugated shape (contiguous rugged arcs) may be used to increase the contact area with the fluid being processed. The diameter and length of the tube may be determined, depending on the respective properties of an original fluid being processed and magnetic particles contained in the original fluid, and should usually be 5 cm to 50 cm in diameter and 100 cm to 300 cm in length, respectively, for the efficient separation of the magnetic particles from the original fluid.

According to the present invention, the flow rate of an original fluid being processed (also called "object fluid") may also be determined, depending upon the respective properties of the original fluid and magnetic particles contained in the fluid, and the particular requirements for the diameter and length of the tube. It should usually be 1 cm/sec to 50 cm/sec. Similarly, the number of rotations for the tube may be determined, depending upon the respective properties of the original fluid and magnetic particles contained in the fluid as well as other requirements. It should usually be 1 rotation/sec to 10 rotations/sec, which may depend upon the particular original fluid being processed.

According to the present invention, the tube may externally be divided into several tube sections, each of which may have a coil winding around the outer periphery thereof. The strength of the magnetic force provided by each of the coil windings may be varied for each respective tube section, by changing the current flow through the respective coil winding and by changing the amount, or the number of turns, of the respective coil winding. Specifically, the strength of the magnetic force may be varied for each tube section such that it is increasing gradually from the first tube section on the inlet side of the tube toward the last section on the outlet side. In this way, an original fluid being processed may contain different types of magnetic particles of different magnitudes, which may be attracted magnetically by the different tube sections when they are flowing though the tube sections of the tube. Thus, the whole tube may be used as a magnet filter.

For example, the ferromagnetic particles such as iron particles may be attracted magnetically by the first tube section that provides the low magnetic force, some less magnetic particles such as Ca, Mg may be attracted magnetically by the following tube section that provides the medium magnetic force (for example, 1.000 Gauss to 10000 Gauss), and other more less magnetic particles (such as gold, nitrogen) may be attracted magnetically by the final section that provides the high magnetic force (over 10000 Gauss). When the original fluid containing magnetic particles of different types and strengths flows through those tube sections, the sections may be magnetized and demagnetized alternately from one section to the following section. The different magnetic particles that have been attracted magnetically by each corresponding section may be collected in each section, which is now demagnetized, by an exhaust fluid that is fed under the applied pressure into the tube.

For instance, when an original fluid or liquid that contains burned ashes solved by water is to be processed in accordance with the present invention, the components such as iron, manganese, etc. may be attracted magnetically by the tube section that provides the low magnetic force, the components such as Mn, Cr, Pd, etc. may be attracted magnetically by the tube section that provides the medium magnetic force, and the components such as dioxin, Cd, Ag, etc. may be attracted magnetically by the tube section that provides the high magnetic force. Thus, all of the less magnetic particles may be magnetized, demagnetized, and then separated from the original fluid or liquid with the higher efficiency.

According to the present invention, a mixture composed of a fluid (liquid or gas) and magnetic particles may be fed as an object being processed (also called "object fluid") into a magnetized rotary tube, the magnetic particles may be attracted magnetically within the tube, the rotary tube may be demagnetized after the feeding of the object fluid is stopped, and an exhaust fluid may then be fed into the tube under the applied pressure. The magnetic attraction and removal of the magnetic particles may be performed automatically by magnetizing and demagnetizing the inner wall of the tube or any ferromagnetic elements within the tube, respectively.

According to the present invention, a plurality of parallel tubes may be provided, and those parallel tubes may be operated alternately so that at least any one of the tubes can always be kept running at any time so that the separation can occur. Thus, the present invention may be utilized for the industrial applications. The free ferromagnetic substances that are fed into the tube may help even certain less magnetic particles be attracted magnetically. Thus, those less magnetic particles can be separated with high reliability.

According to the present invention, an original fluid that contains the magnetic particles may be fed into the magnetized rotary tube as an object being processed (also called "object fluid"), and then the magnetized rotary tube may be rotated so that the magnetic attracting action can be utilized to its full ability. Thus, the separating efficiency can be enhanced.

According to the present invention, the magnetic particles that have been attracted magnetically within the tube may be removed from the tube by demagnetizing and counterflow-cleaning the tube, before the magnetic attraction becomes lower below a certain value. Thus, the continuous operation may be achieved with the same efficiency.

According to the present invention, the separation can occur continuously by running a plurality of separator tubes in parallel. When the operation for the magnetic attraction would take longer to be completed than the operation for the counterflow-cleaning, one separator tube may be counterflow-cleaned while the other separator tubes may be kept running. Conversely, the operation for the counterflow-cleaning would take longer to be completed than the operation for the magnetic attraction, one separator tube may be kept running while the other separator tubes may be counterflow-cleaned. In either case, at least one separator tubes can always be kept running at any time, and the overall efficiency can be enhanced accordingly.

BRIEF DESCRIPTION OF THE DRAWINGS

FIG. 11(*b*) is a partial longitudinal cross-sectional view showing the separator tube in the apparatus according to one embodiment of the present invention;

FIG. 12(*b*) is a partial cross-sectional side elevation used to explain how the magnetic attraction occurs within the separator tube in the apparatus according to one embodiment of the present invention;

FIG. 13(*b*) is a partial cross-sectional side elevation used to explain how the demagnetization occurs within the separator tube in the apparatus according to one embodiment of the present invention;

FIG. 14(*b*) is a perspective view showing another screw used as the free ferromagnetic substance according to one embodiment of the present invention;

FIG. 14(*c*) is a perspective view showing an elliptical ball used as the free ferromagnetic substance according to one embodiment of the present invention; and FIG. 14(*d*) is a perspective view showing a round ball used as the free ferromagnetic substance according to one embodiment of the present invention.

BEST MODE OF EMBODYING THE INVENTION (Embodiment 1)

Figure 1:
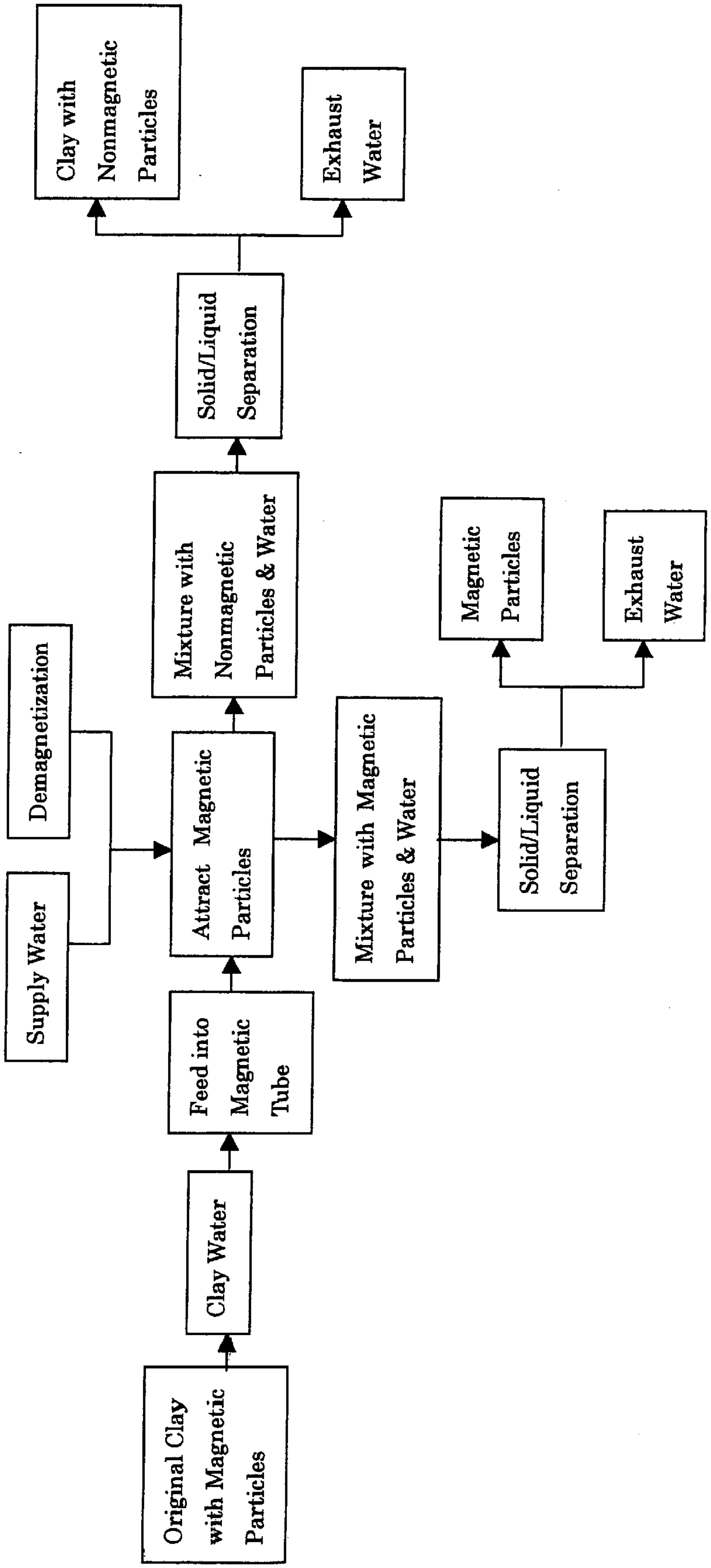
FIG. 1 is a block diagram showing the method according to one embodiment of the present invention.

The method according to one embodiment of the present invention is now described by referring to FIG. 1, where porcelain clay is used as an object being processed, and contains magnetic particles that are to be separated from the clay.

A suitable quantity of water (which is typically equal to five times the quantity of clay) is added to clay, and they are admixed by stirring. The resulting mixture (clay water) (referred hereinafter to as "object fluid") is then fed into a tube while it is rotating and being magnetized. In this case, the tube may have the cross-sectional area that is equal to ten times that of a feed pipe from which the clay water is fed into the tube. Thus, the clay water may flow through the tube at the flow rate that is substantially equal to one tenth of the flow rate for the feed pipe. The magnetic particles, such as iron, titanium, manganese, etc, that are contained in the clay water may be attracted magnetically to the inner wall of the magnetized tube, while it is flowing through the tube at the above flow rate. As the tube is rotating, the magnetic particles in the clay water may be attracted magnetically to the inner wall of the tube all over its area. Then, the feeding of the clay water may be stopped at an appropriate time, and the clay water from which the magnetic particles have been removed by the magnetic attraction and that stays in the tube may be removed from the tube. Following this, the tube is demagnetized, and pressurized water is fed into the tube. Thus, the magnetic particles that stay in the tube may be removed from the tube together with the pressurized water. The magnetic particles now contained in the pressurized water may be separated from the water, both of which may be disposed of in some manner.

The clay water that has been processed as described above contains no magnetic particles (such as iron, titanium, manganese), and the resulting clay has its increased whiteness. The product that may be obtained by baking this clay, such as porcelain, looks like white. Colorings applied to this white porcelain may exhibit the better color quality.

(Embodiment 2)

Figure 2:
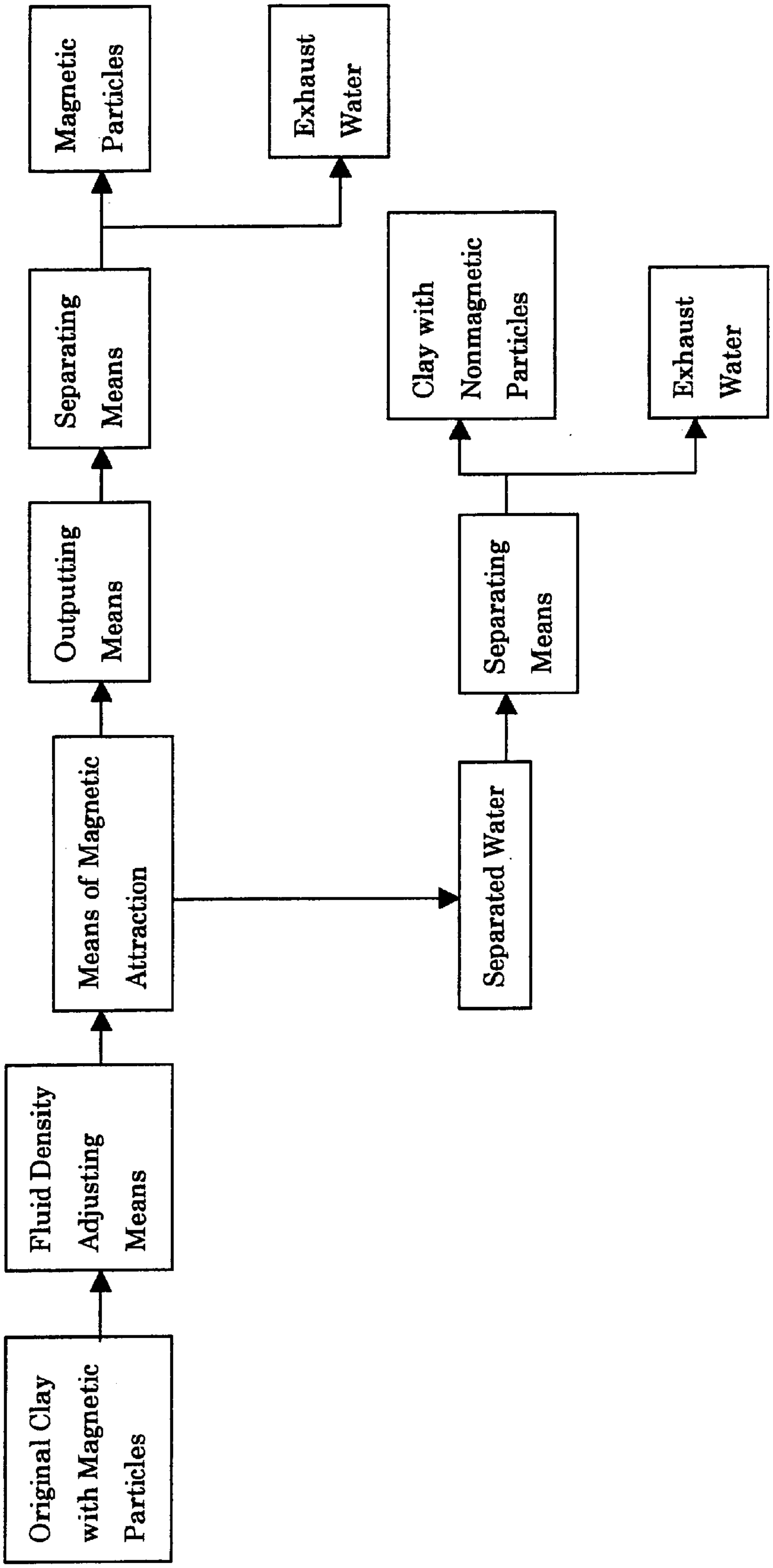
FIG. 2 is a block diagram showing the system according to one embodiment of the present invention.

A system according to one embodiment of the present invention is now described by referring to FIG. 2. Original porcelain clay that contains magnetic particles is solved in water by a fluid density adjusting means, which provides clay water of the adjusted density that will be processed as described below. Then, the clay water is fed into a tube that is rotating and being magnetized. As it is flowing through the tube, the magnetic particles contained in the clay water may be attracted magnetically to the magnetized surfaces within the tube. The clay water, from which the magnetic particles have thus been removed by the magnetic attraction, may be removed from the tube. The resulting clay water with no magnetic particles contains solids and water, which may be separated by using the technique, such as the specific-gravity separation process and the like. The clay solid thus obtained contains no magnetic particles other than nonmagnetic particles, while the water thus obtained will be disposed of in some manner. In the meantime, the magnetic attraction of the magnetic particles to the magnetized surfaces (inner wall of the tube) within the rotating tube may continue until the magnetic attraction is about to reach its saturation. That is, the feeding of the original clay water into the tube is stopped just before the magnetic attraction has reached its saturation. As the magnetic saturation is determined by the particular magnetic particles contained in an object being processed (also called "object fluid"), the timing at which the feeding of the original clay water is to be stopped may be previously set by a timer that responds to the approaching magnetic saturation. After the original clay water has thus been processed, and then has completely been removed from the tube, the tube is demagnetized. Next, an exhaust fluid, such as clean water or air or combination of both, is fed under the applied pressure into the tube in the direction opposite to that in which the original clay water is fed. This may detach the magnetic particles from the magnetized surfaces within the tube, and the exhaust water or air carrying the detached magnetic particles therewith may be removed from the tube. They may be separated into the magnetic particles and the exhaust water or air by the specific-gravity separation, filtering or other separating means.

(Embodiment 3)

The apparatus according to one embodiment of the present invention is now described by referring to FIGS. 3, 4, 5, and 6. Two magnetized tubes 2, 2*a* each include four round tube sections 4, 4*a,* 4*b,* 4*c* that are connected in series. Each of the tube sections 4, 4*a,* 4*b,* 4*c* in the magnetized tubes 2, 2*a* has electrical coil windings 5, 5*a,* 5*b,* 5*c* around the outer periphery thereof, respectively, which are connected in series. Separator tubes 3, 3*a* are thus formed, and are mounted on the machine base 1. Each of the separator tubes 3. 3*a* has a branch pipe 8, 8*a* at the one end of each separator tubes 3, 3*a.* The said branch pipe 8, 8*a* are rotatably connected to a feed pipe 6, 6*a* respectively, so that the magnetized tubes 2, 2*a* are rotatably connected to a feed pipe 6, 6*a* respectively at the one end. And the other end of separator tubes 3, 3*a* are rotatably connected to a delivery pipe 7, 7*a* respectively, so that the magnetized tubes 2, 2*a* are rotatably connected to a delivery pipe 7, 7*a* respectively at the other end. The branch pipes 8, 8*a* communicates with the corresponding magnetized tubes 2, 2*a* at the one end, and have a pulley 9, 9*a* fixed thereto. The pulleys 9, 9*a* are linked with the pulleys 11, 11*a* on the corresponding motors 10, 10*a* by means of belts 12, 12*a.* The magnetized tubes 2, 2*a* may be rotated by driving the motors 10, 10*a,* respectively.

The delivery pipe 7 is connected to a connecting pipe 14 via a pinch valve 13, and the connecting pipe 14 is connected to the delivery pipe 7*a* and to an outlet pipe 16 via another pinch valve 15. The feed pipes 6, 6*a* are connected to a connecting pipe 19 via pinch valves 17, 18, respectively, and the connecting pipe 19 is connected to a delivery pipe 21 which is connected to a pump 20.

In operation, the clay water, which may be obtained by adding to the original clay the quantity of water equal to five times the quantity of the clay, may be delivered from the pump 20 in the direction of arrows 22, 23, 24, 25. Then, the clay water may flow through the branch pipe 8 into the magnetized tube 2, as indicated by an arrow 26, going through the magnetized tube 2 as indicated by an arrow 27. At the output end of the magnetized pipe 2, the clay water may flow through the delivery pipe 7 and through the pinch valve 13 into the connecting pipe 14, as indicated by arrows 28, 29, from which it may go through the pinch valve 15 and through the exhaust pipe 16 to the following stage.

During the above sequence of operations, the magnetized tube 2, for example, is driven by the motor 10 and is rotating. At the same time, the electrical coil windings 5, 5*a,* 5*b,* 5*c* are energized, producing the magnetic fields of the respective strength that may cause the tube sections 5, 5*a,* 5*b,* 5*c* in the magnetized tube 2 to be magnetized, respectively, according to the respective strengths of the magnetic fields. This causes the magnet particles contained the clay water to be attracted magnetically to the inner wall of the magnetized tube 2 all over its area.

When a considerable amount of the magnetic particles have been attracted magnetically within the magnetized tube 2 of the separator tube 3, the pinch valves 17, 13 may be closed and the pinch valve 18 may be opened, allowing the clay water to pass through the feed pipe 6*a* into the magnetized tube 2*a,* as indicated by arrows 31, 32, 33, 34 where the magnetic particles are magnetically attracted and separated from the clay water. The clay water, which may still contains any remaining amount of magnetic particles, then passes through the delivery pipe 7*a* into the connecting pipe 14 as shown by an arrow 35, going into the outlet pipe 16 from which it is delivered as shown by an arrow 30. Within the separator tube 3*a,* the remaining magnetic particles contained in the clay water are also magnetically attracted and separated from the clay water, which may occur in the same manner as for the separator tube 3.

Within the separator tube 3, in the meantime, when the pinch valves 17, 13 are closed as described above, air is delivered from an air feed pipe 36 through an air valve 40 into a delivery pipe 7, as indicated by arrows 51, 53, 41. This air forces the clay water in the magnetized tube 2 to flow reversely, which goes through a valve 54 and a connecting pipe 55 back into an outlet pipe 56, as shown by an arrow 57, from which it may be discharged. When the clay water is completely removed from the magnetized tube 2, the magnetized tube 2 may be demagnetized, and a valve 39 may be opened to allow clean air to go into a water supply pipe 38 as indicated by an arrow 50. At the same time that the valve 39 for the water supply pipe 38 is opened, the air valve 40 may be opened to allow air to be supplied. The water from the water feed pipe 38 and the air from the air feed pipe 36 are mixed together, which mixture goes through the delivery pipe 7 into the magnetized tube 2, as indicated by arrows 41, 42, 43, in which the mixture of water and air flows reversely, cleaning the interior of the magnetized tube 2. By this counterflow cleaning, the magnetic particles previously attached to the inner wall of the magnetized tube 2 may be detached from the inner wall. The magnetic particles thus detached may flow backwardly through the feed pipe 6 together with the clean water, going through the valve 37 and the connecting pipe 58 back into the outlet pipe 44, as shown by arrows 45, 46, from which it is delivered to a sedimentation tank 47. Within the sedimentation tank 47, the magnetic particles contained in the outlet water, such as iron, titanium, manganese, etc. may be separated from the water by the specific gravity separation or any other process.

Although the operation has been described so far in connection with the separator tube 3, the foregoing description may apply to the separator tube 3*a* as well.

Figure 3:
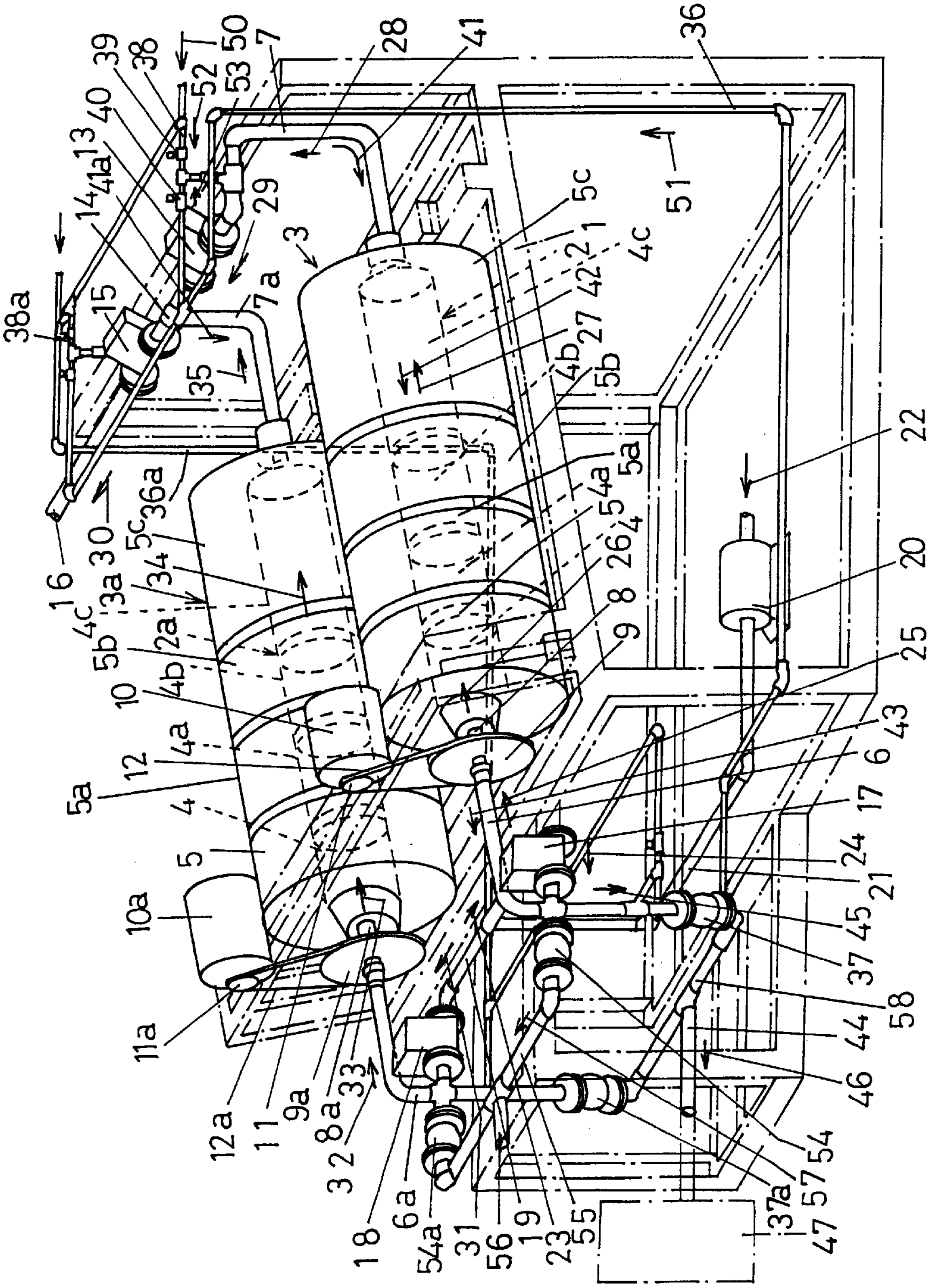
FIG. 3 is a perspective view showing the apparatus according to one embodiment of the present invention.
Figure 4:
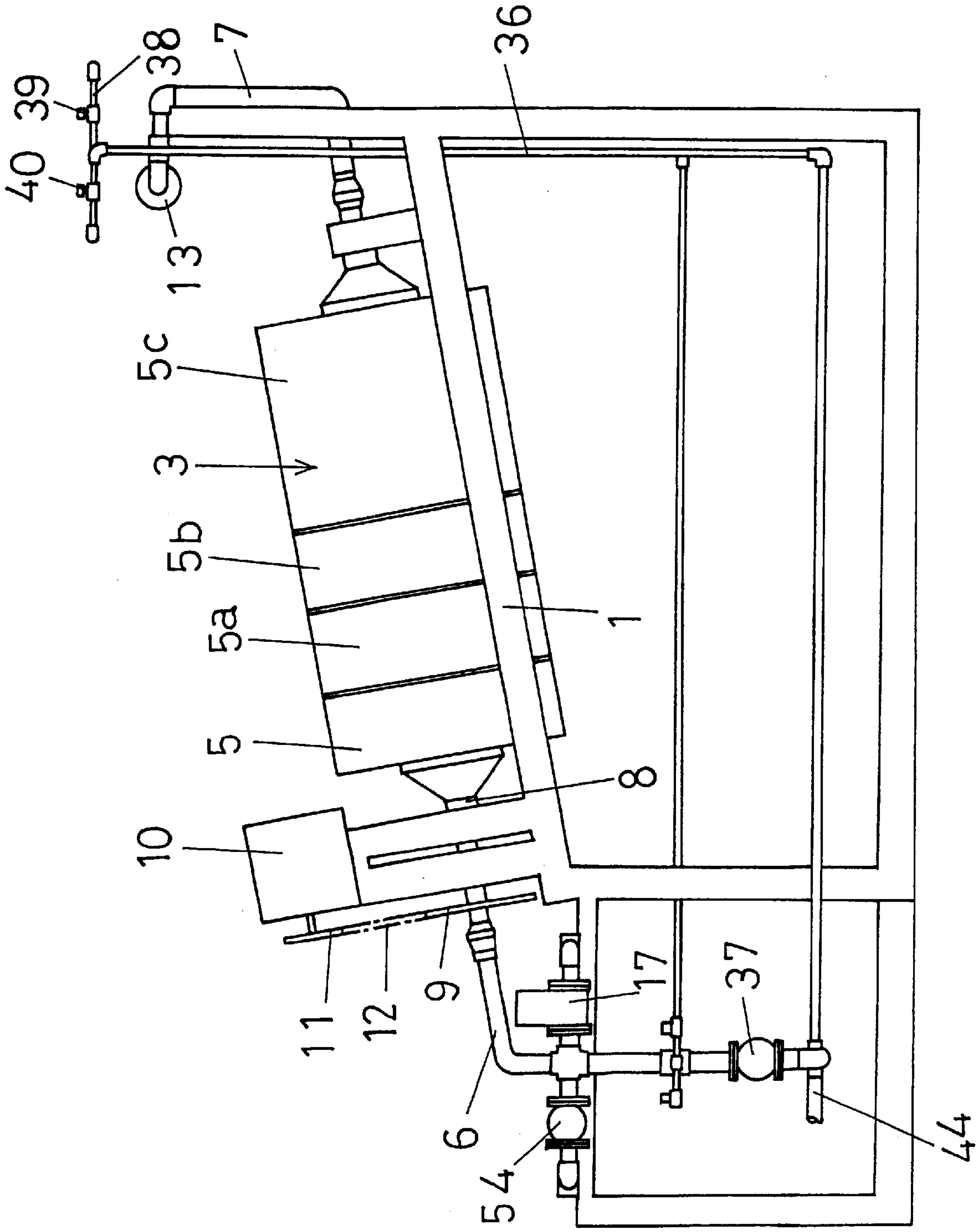
FIG. 4 is a front view showing the apparatus according to one embodiment of the present invention.
Figure 5:
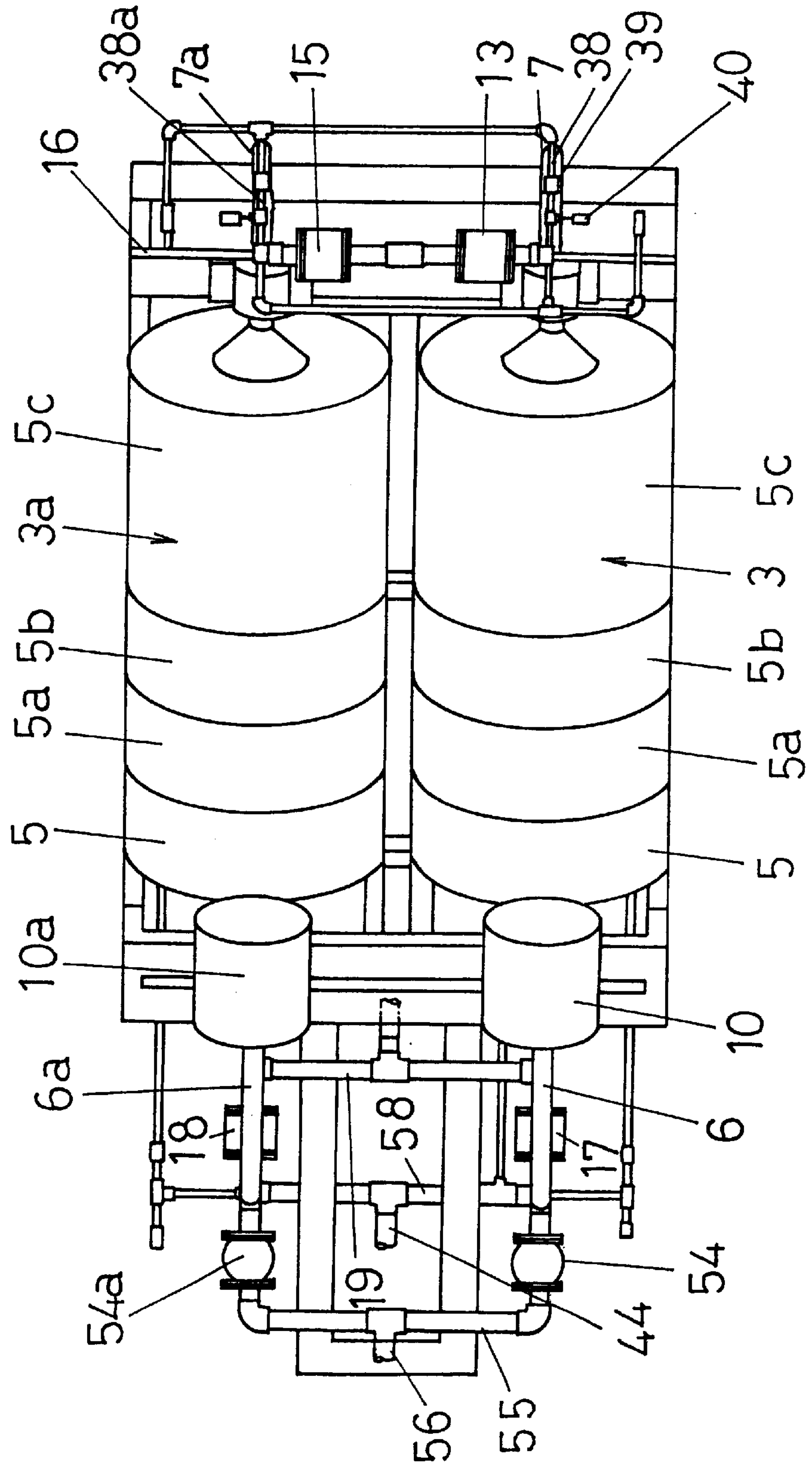
FIG. 5 is a plan view showing the apparatus according to one embodiment of the present invention.
Figure 6:
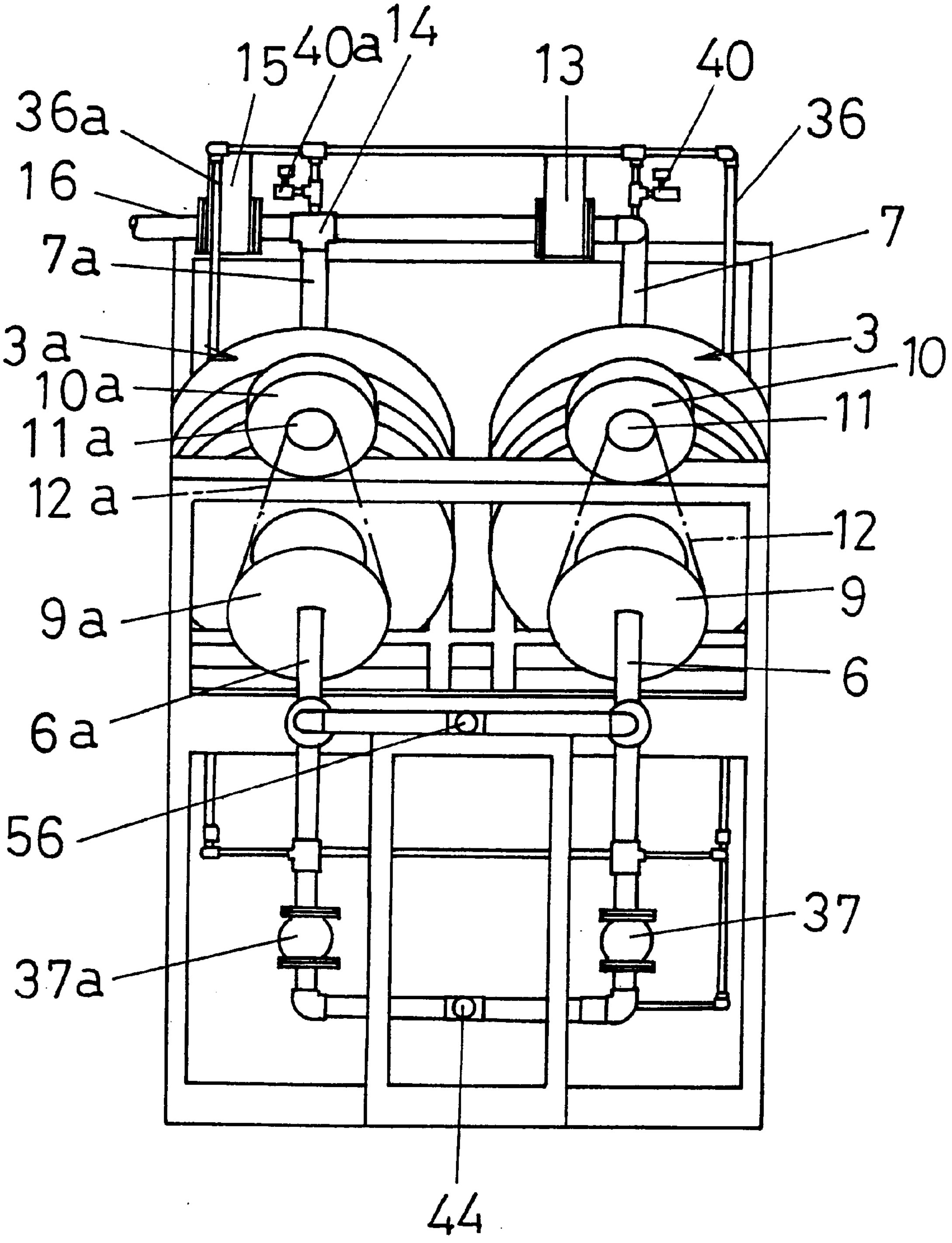
FIG. 6 is a side elevation showing the apparatus according to one embodiment of the present invention.

Specifically, referring then to FIG. 3, when the pinch valves 13, 17 are closed and the pinch valve 18 is opened, and the motor 20 is then started, the original clay water containing the magnetic particles such as iron may be fed through the feed pipe 6*a* into the magnetized tube 2*a,* as shown by arrows 22, 31, 32, where the magnetic particles may be attracted magnetically. The clay water, from which the magnetic particles have been removed, may only contain nonmagnetic particles, and may be delivered through the delivery pipe 7*a* and then through the pinch valve 15 to the following stage, as shown by arrows 35, 30. While flowing through the magnetized tube 2*a,* the magnetic particles contained in the original clay water may mostly be attracted magnetically to the inner wall of the tube 2*a,* and the pinch valves 18, 15 may be closed and a valve 54*a* may be opened just before the magnetic attracting capability becomes lower below a certain value, allowing a pressurized air to be fed into the magnetized tube 2*a*. The air may be fed through the air feed pipe 36*a* into the tube 2*a,* forcing the clay water to flow reversely through the tube 2*a* and forcing it to be removed from the tube 2*a* through the valve 54*a,* the connecting pipe 55 and the output pipe 56, together with the supplied air.

Some of the operations that occur for the separator tube 3*a* have just been described above, but the other operations are the same as those for the separator tube 3 that have already been described. To avoid the duplication of the description, those operations that occur within the separator tube 3*a* will be omitted.

As described, the separator tubes 3, 3*a* are arranged in parallel on the machine base 1, and the separating and cleaning operations may be performed alternately between the separator tubes 3 and 3*a*. That is, one separator tube 3, for example, may be used for the separating operation while the other separator tube 3*a,* for example, is used for the cleaning operation, or vise versa. Thus, either of the separator tubes 3, 3*a* may be kept running at any time so that the separation operation can occur. Thus, the total separating efficiency can be achieved. More specifically, the separating operation may continue within the separator tube 3, for example, until the magnetic attraction becomes lower below the certain value, at which time the separator tube 3 may be switched to the cleaning operation mode, while the other separator tube 3*a,* for example, may be switched to the separating operation mode. As the two separator tubes 3, 3*a* can thus work together, and either can be kept running without any interruption, the separating efficiency can be enhanced.

Figure 7:
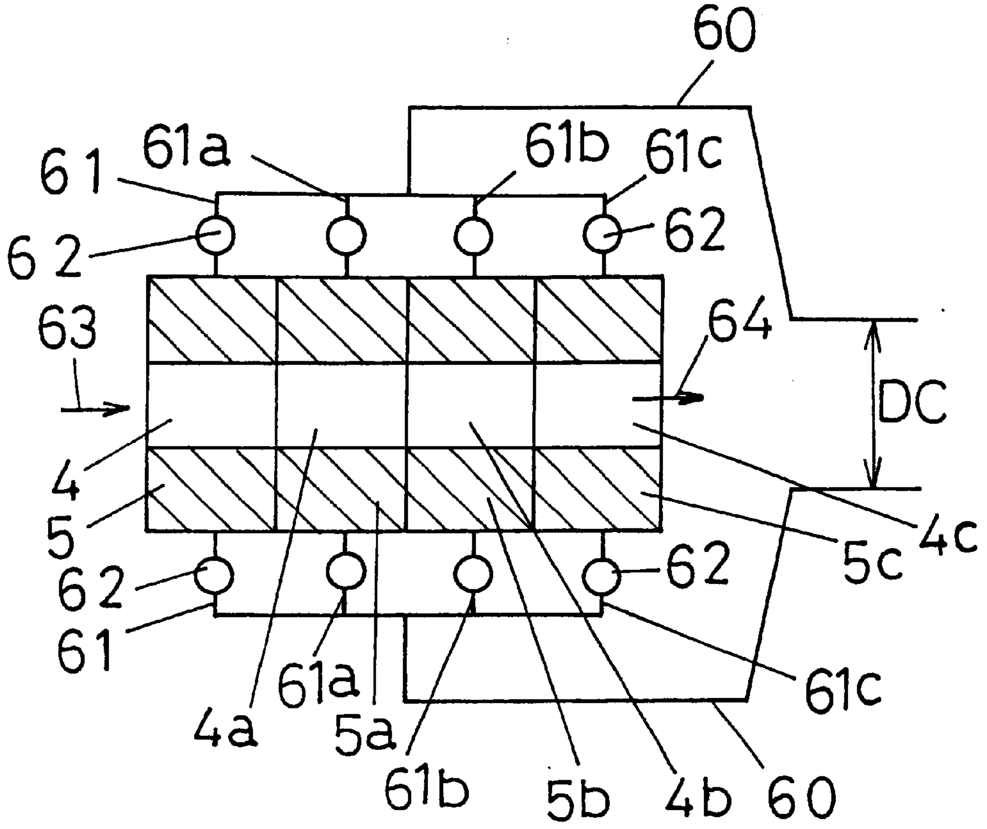
FIG. 7 is a partial cross-sectional view used to explain the concept of the separator tube in the apparatus according to one embodiment of the present invention.

In this embodiment, as shown in FIG. 7, the magnetized tube 2 includes four contiguous tube sections 4, 4*a,* 4*b,* 4*c* (such as magnetized stainless tubes) connected in series, each of which has a coil winding 5, 5*a,* 5*b,* 5*c* around the outer periphery thereof, respectively. Each of the coil windings 5, 5*a,* 5*b,* 5*c* has a branch wire 61, 61*a,* 61*b,* 61*c* connected to cords 60, 60, respectively, and each of the branch wires 61, 61*a,* 61*b,* 61*c* is connected through transformers 62, 62 to each respective coil winding so that the magnetic force provided by each of the coil windings 5, 5*a,* 5*b,* 5*c* can be controlled adjustably. For example, as shown by an arrow 63 in FIG. 7, the tube section located on the inlet side may provide the minimum magnetic force, and as shown by arrow 64, the tube section located on the outlet side may provide the maximum magnetic force. Thus, the magnetic force may be increasing from the tube section on the inlet side toward the tube section on the outlet side.

Thus, the ferromagnetic particles may easily be attracted magnetically when they are passing through the tube section on the inlet side that provides the low magnetic force, and the less magnetic particles may easily be attracted magnetically when they are passing through the tube section on the outlet side that provides the magnetic force that is high enough to attract the less magnetic particles magnetically. Totally, all kinds of magnetic particles such as ferromagnetic particles, less magnetic particles may be attracted magnetically when passing through the four tube sections.

By controlling the transformer 62, the magnetic force may be adjusted as required for each magnetized tube section so that each can provide the different magnitude of the magnetic force. Instead of adjusting the magnetic force of each coil winding by using the transformer, each coil winding may be previously set to provide each respective magnitude of the magnetic force (for example, by changing the number of coil turns for each), and may be mounted on each corresponding magnetized tube section. In this way, all kinds of magnetic particles, including the ferromagnetic particles, less magnetic particles and much less magnetic particles, may be attracted magnetically according to the magnitude of the magnetic force, when passing through the different magnetized tube sections. In this sense, the sequence of the magnetized tube sections may act as the filter that accepts some kinds of magnetic particles and rejects other kinds of magnetic particles. Finally, all kinds of magnetic particles will have been attracted magnetically, and will thus have been separated from the object fluid, when they have gone throughout all the magnetized tube sections.

Figure 8:
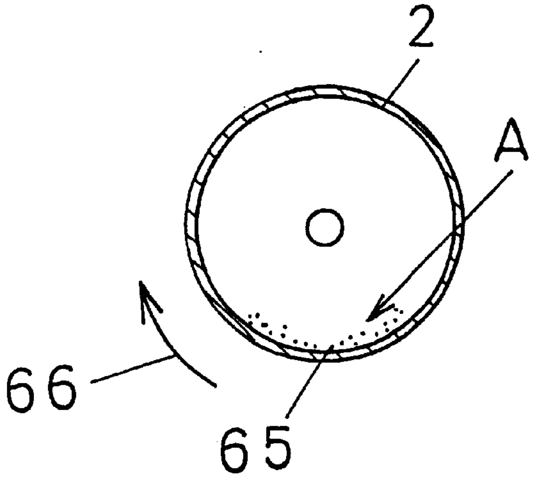
FIG. 8 is an enlarged cross-sectional view used to explain how the magnetic attraction occurs within the magnetized tube.

According to the apparatus as described above, the magnetic attraction can occur in the rational manner since the magnetized tube 2 is rotating. For example, as shown in FIG. 8, more of the magnetic particles 65 may tend to be attracted magnetically to the bottom wall of the tube (the part A in FIG. 8). When the magnetized tube 2 is rotating slowly in the direction as indicated by an arrow 66, the part A of the magnetized tube 2, on which more of the magnetic particles may tend to be attached magnetically is also moving around. Thus, the magnetic particles may be distributed evenly over the inner wall of the tube 2 where the magnetized particles may be attracted magnetically. Thus, the separation may be performed efficiently. As the magnetized tube is rotating, the time required to demagnetize the tube can be reduced.

(Embodiment 4)

Figure 9:
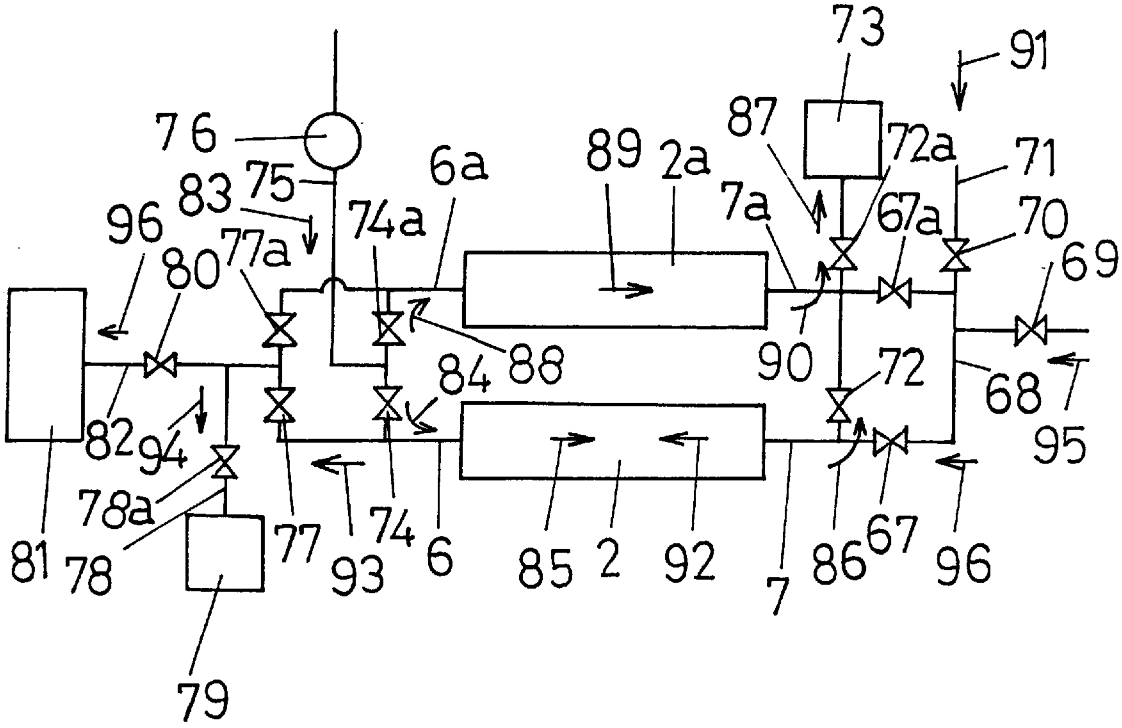
FIG. 9 is a conceptual view used to explain the apparatus according to another embodiment of the present invention.

The apparatus according to another embodiment of the present invention is now described by referring to FIG. 9. At the left side of magnetized tubes 2, 2*a,* they are rotatably connected to a feed pipe 6, 6*a* respectively. And at the right side of magnetized tubes 2, 2*a,* they are rotatable connected to a delivery pipe 7, 7*a* respectively. The delivery pipes 7, 7*a* are connected through respective valves 67, 67*a* to a water feed pipe 68, which is connected through a valve 70 to a water delivery pump (not shown). The delivery pipes 7, 7*a* are also connected through respective valves 72, 72*a* to a processing liquid reservoir 73.

The feed pipes 6, 6*a* are connected through respective valves 74, 74*a* to an inlet pipe 75, which is connected through the pump 76 to a processed liquid reservoir (not shown). The feed pipes 6, 6*a* are further connected through respective valves 77, 77*a,* and then through a valve 80 and an outlet pipe 82 to a magnetic particles reservoir 81 for containing the magnetic particles that have once been attached magnetically and then detached within the magnetized tubes. The feed pipes 6, 6*a* are also connected through the respective valves 77, 77*a* and then through a valve 78*a* and an outlet pipe 78 to a reservoir 79 for containing the processed fluid.

The operation is now described according to this embodiment. The pump 76 is started up, and then the valves 74*a,* 77, 67, 67*a* are closed and the valves 74, 72, 72*a* are opened, allowing an original fluid being processed (also called "object fluid") to flow through the magnetized tube 2 that is rotating and being magnetized, as indicated by arrows 83, 84, and 85. While passing through the tube 2, the magnetic particles in the original fluid may be attracted magnetically to the inner wall of the magnetized tube 2, and may thus be separated from the fluid. The fluid, from which the magnetic particles have been separated, may go through the valves 72, 72*a* into the processed liquid reservoir 73, as indicated by arrows 86, 87. The above magnetic attraction and separation may continue until the magnetic attracting and separating performance becomes lower in a certain period of time, at which time the valves 77*a,* 74, 72, 67*a* may be closed and the valve 74*a,* 72*a* may be opened, allowing the processed fluid to go into the processing liquid reservoir 73, as shown by arrows 88, 89, 90, 87. In the meantime, the valves 70, 67, 77, 78*a* may be opened and the valves 67*a,* 69, 72, 74, 77*a,* 80 may be closed, allowing a pressurized air to be supplied from the air feed pipe 71 as indicated by an arrow 91. This pressurized air may force the processed fluid remaining in each pipe and within the magnetized tube 2 to be brought back into the processed fluid reservoir 79, as indicated by arrows 92, 93, 94. Following this, the coil windings mounted around the outer periphery of the tube sections in the magnetized tube 2, which are now energized for magnetizing the tube 2, may be de-energized to make the tube sections in the tube 2 demagnetized. Then, the valves 69, 77, 80 may be opened and the valves 77, 78*a* may be closed, allowing a pressurized clean water to be supplied through the water feed pipe 68 as shown by an arrow 95 into the tube 2. This pressurized clean water may force the magnetic particles attached to the inner wall of the tube 2 to be detached therefrom, and those magnetic particles may be brought back into the magnetic particles reservoir 81 together with the pressurized clean water. Within the reservoir 81, the clean water containing the detached magnetic particles may be separated into water and magnetic particles by using the specific gravity separation or other process. By now, all operations will be completed.

The process of removing the magnetized particles from the magnetized tube 2*a,* in the same manner as described above for the magnetized tube 2. To avoid the duplication, therefore, no further information will be presented here.

(Embodiment 5)

Figure 10:
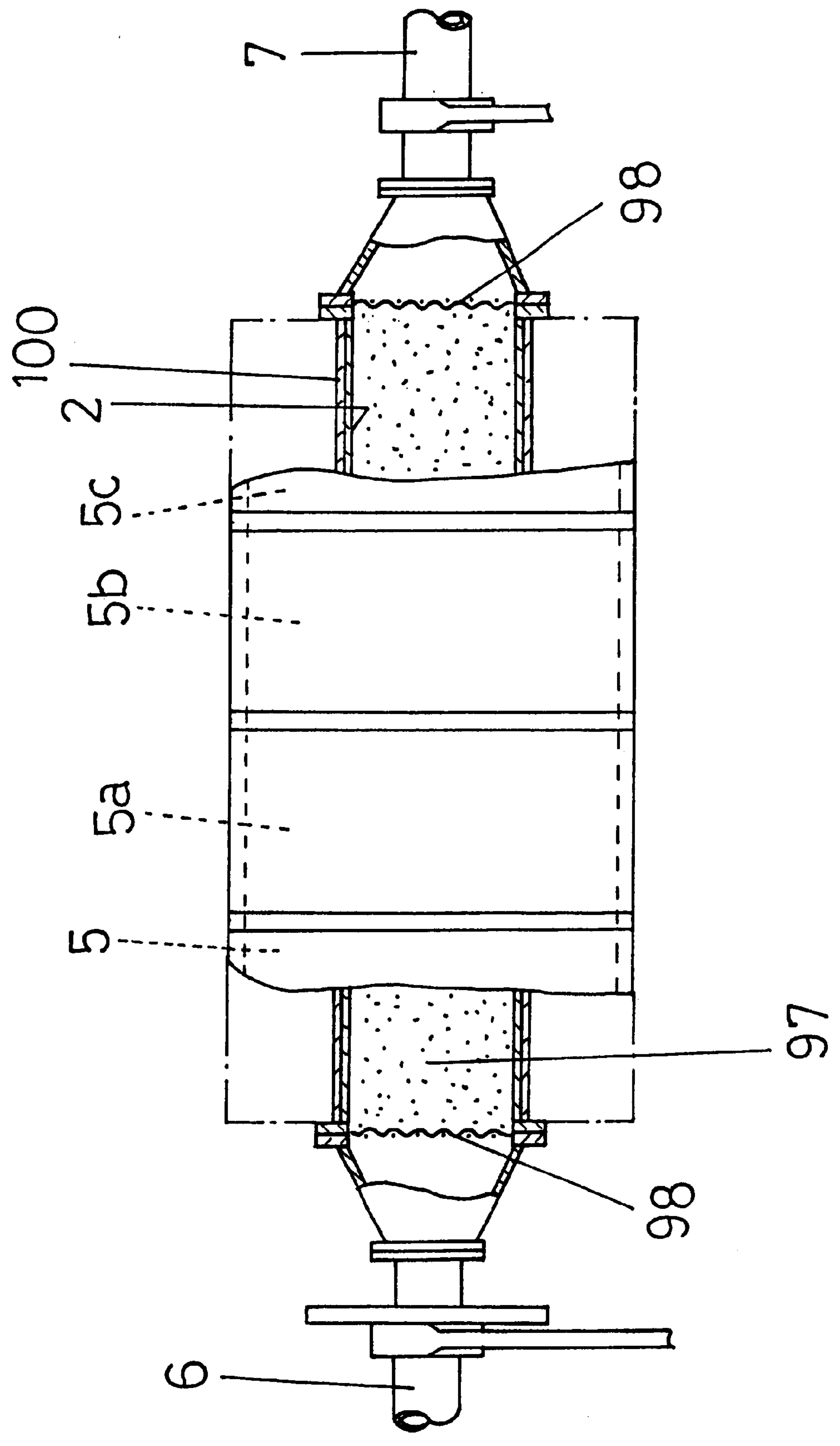
FIG. 10 is a side elevation showing the separator tube in the apparatus according to one embodiment of the present invention, with some parts broken away and some parts omitted.
Figure 11A:
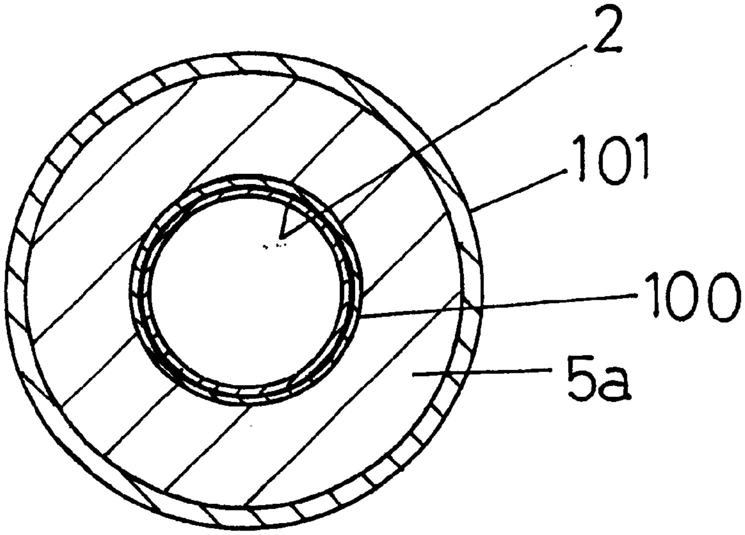
FIG. 11(*a*) is a longitudinal cross-sectional front view showing the separator tube in the apparatus according to one embodiment of the present invention.
Figure 11B:
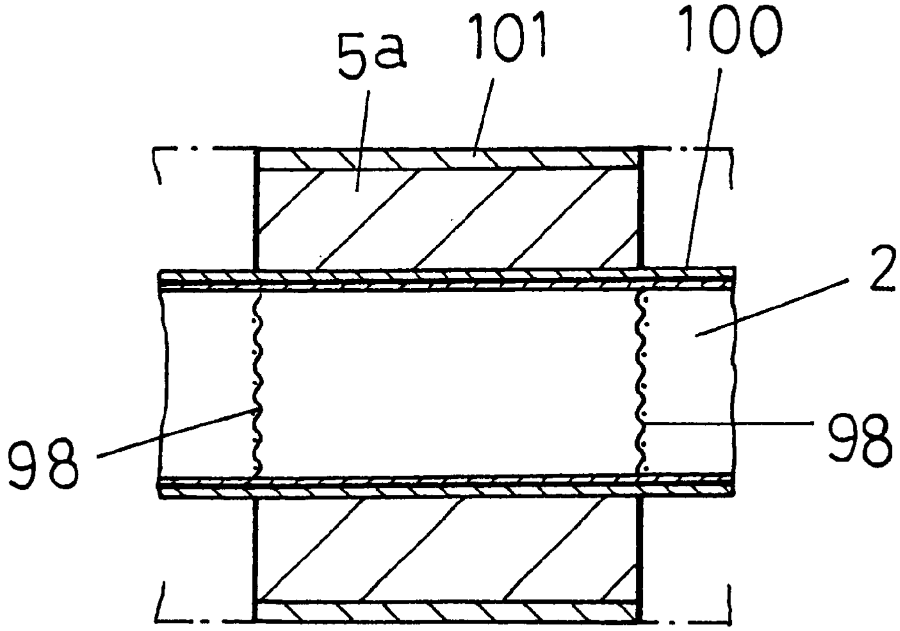
Figure 12A:
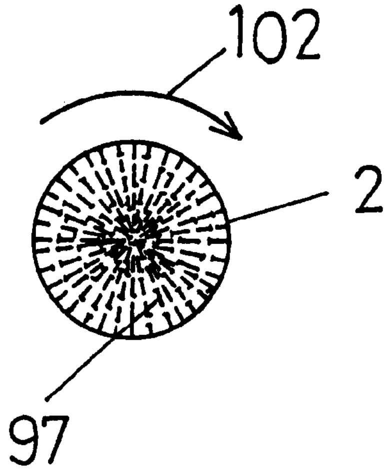
FIG. 12(*a*) is a cross-sectional front view used to explain how the magnetic attraction occurs within the separator tube in the apparatus according to one embodiment of the present invention.
Figure 12B:
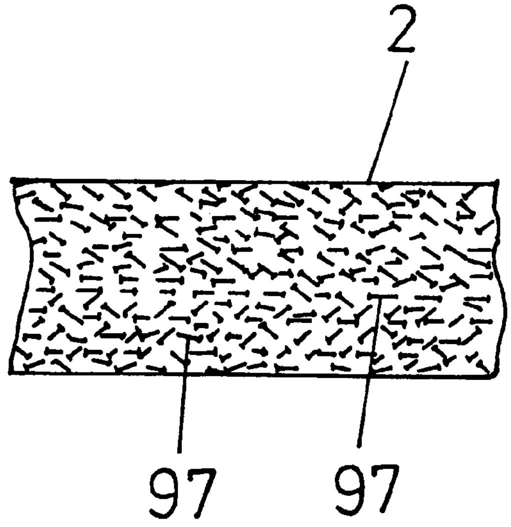

The apparatus according to another embodiment of the present invention is now described by referring FIGS. 10, 11, and 12. At the left side of magnetized tube 2, it is rotatable connected to a feed pipe 6. And at the right side of magnetized tubes 2, it is rotatably connected to a delibery pipe 7. The magnetized tube 2 is, rotatably mounted inside an inner tube 100 having coil windings 5, 5*a,* 5*b,* 5*c* mounted around it. Each of the coil windings 5, 5*a,* 5*b* and 5*c* may provide a different magnetic force, or magnetic field, depending on the appropriate number of turns. Those coil windings 5, 5*a,* 5*b,* and 5*c* may be shielded by a protective jacket 101 mounted around them.

The magnetized tube 2 contains stainless screws 97 as the free ferromagnetic elements, which are sealed within the tube 2. Although the size of the screw 97 is arbitrary, too large a screw would reduce the area on which the magnetic particles are to be attracted magnetically, while too small a screw would make it difficult to separate the magnetic particles from the screw, and the screws cannot be held within the magnetized tube 2. Therefore, the screws should preferably have the outer diameter of between 2 mm and 5 mm, and the length of between 10 mm and 30 mm.

Instead of using screws, any small solid elements that are ferromagnetic and have the large surface area may be used as the free ferromagnetic elements, such as small balls 97*a* or elliptical balls 97*b* that have a plurality of projections thereon and which may be held within the magnetized tube 2 (FIG. 14).

The magnetized tube 2 is divided into several tube sections that correspond to the coil windings 5, 5*a,* 5*b* and 5*c,* each of which may be controlled to produce a different strength of the magnetic force. Thus, any neighboring sections may be physically separated by nets 98, 98 that prevent screws 97 in one section from entering its neighboring section or sections. thus be separated from the fluid. The fluid, from which the magnetic particles have been separated, may go through the valves 72, 72*a* into the processed liquid reservoir 73, as indicated by arrows 86, 87.

The above magnetic attraction and separation may continue until the magnetic attracting and separating performance becomes lower in a certain period of time, at which time the valves 77*a,* 74, 72, 67*a* may be closed and the valve 74*a* may be opened, allowing the processed fluid to go into the processing liquid reservoir 73, as shown by arrows 88, 89, 90, 87. In the meantime, the valves 70, 67, 77 may be opened and the valves 72, 74, 80 may be closed, allowing a pressurized air to be supplied from the air feed pipe 71 as indicated by an arrow 91. This pressurized air may force the processed fluid remaining in each pipe and within the magnetized tube 2 to be brought back into the processed fluid reservoir 79, as indicated by arrows 92, 93, 94. Following this, the coil windings mounted around the outer periphery of the tube sections in the magnetized tube 2, which are now energized for magnetizing the tube 2, may be de-energized to make the tube sections in the tube 2 demagnetized. Then, the valves 69, 80 may be opened and the valves 77, 78*a* may be closed, allowing a pressurized clean water to be supplied through the water feed pipe 68 as shown by an arrow 95 into the tube 2. This pressurized clean water may force the magnetic particles attached to the inner wall of the tube 2 to be detached therefrom, and those magnetic particles may be brought back into the magnetic particles reservoir 81 together with the pressurized clean water. Within the reservoir 81, the clean water containing the detached magnetic particles may be separated into water and magnetic particles by using the specific gravity separation or other process. By now, all operations will be completed.

The process of removing the magnetized particles from the magnetized tube 2*a,* in the same manner as described above for the magnetized tube 2. To avoid the duplication, therefore, no further information will be presented here.

(Embodiment 5)

The apparatus according to another embodiment of the present invention is now described by referring FIGS. 10, 11, and 12. The magnetized tube 2 has the feed pipe 6 rotatably connected to one end thereof on the left side, and has the delivery pipe 7 rotatably connected to the other end on the right side. The magnetized tube 2 is rotatably mounted inside an inner tube 100 having coil windings 5, 5*a,* 5*b,* 5*c* mounted around it. Each of the coil windings 5, 5*a,* 5*b* and 5*c* may provide a different magnetic force, or magnetic field, depending on the appropriate number of turns. Those coil windings 5, 5*a,* 5*b,* and 5*c* may be shielded by a protective jacket 101 mounted around them.

The magnetized tube 2 contains stainless screws 97 as the free ferromagnetic elements, which are sealed within the tube 2. Although the size of the screw 97 is arbitrary, too large a screw would reduce the area on which the magnetic particles are to be attracted magnetically, while too small a screw would make it difficult to separate the magnetic particles from the screw, and the screws cannot be held within the magnetized tube 2. Therefore, the screws should preferably have the outer diameter of between 2 mm and 5 mm, and the length of between 10 mm and 30 mm.

Instead of using screws, any small solid elements that are ferromagnetic and have the large surface area may be used as the free ferromagnetic elements, such as small balls 97*a* or elliptical balls 97*b* that have a plurality of projections thereon and which may be held within the magnetized tube 2 (FIG. 14).

The magnetized tube 2 is divided into several tube sections that correspond to the coil windings 5, 5*a,* 5*b* and 5*c,* each of which may be controlled to produce a different strength of the magnetic force. Thus, any neighboring sections may be physically separated by nets 98, 98 that prevent screws 97 in one section from entering its neighboring section or sections.

Figure 13A:
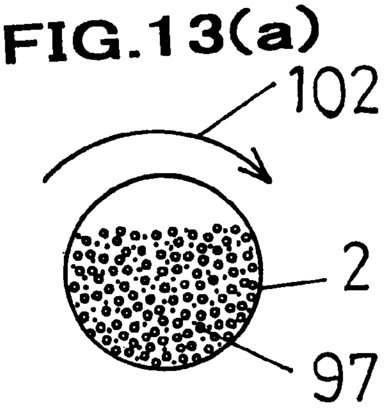
FIG. 13(*a*) is a cross-sectional front view used to explain how the demagnetization occurs within the separator tube in the apparatus according to one embodiment of the present invention.
Figure 13B:
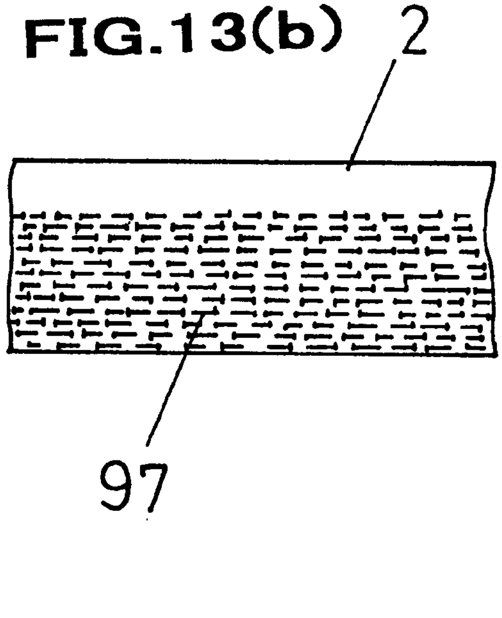
Figure 14A:
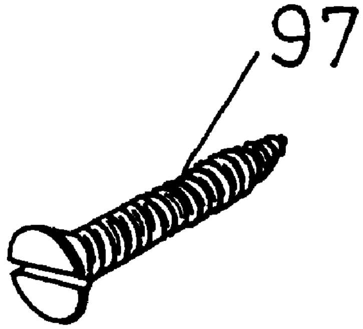
FIG. 14(*a*) is a perspective view showing a screw used as the free ferromagnetic substance according to one embodiment of the present invention.
Figure 14B:
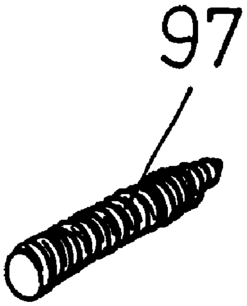
Figure 14C:
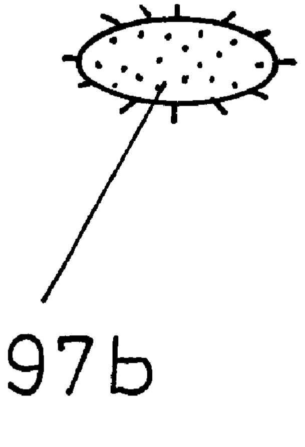
Figure 14D:
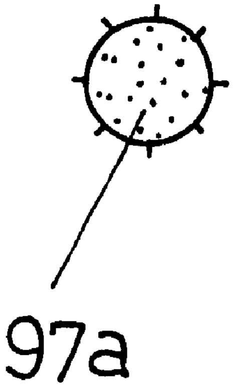

According to this embodiment, when the coil windings 5, 5*a,* 5*b,* 5*c* are energized, the screws 97, 97 may be magnetized in one particular direction, as shown in FIG. 12(*a*) and FIG. 12(*b*). As the magnetized tube 2 is then rotated (as indicated by an arrow 102), the magnetic particles contained in an original fluid being processed (also called "object fluid") may be attracted magnetically and effectively by those screws 97, 97. When the coil windings are de-energized, the condition will become stable as shown in FIG. 13(*a*) and FIG. 13(*b*), but as the magnetized tube 2 is still rotating as shown by an arrow 102, the screws 97, 97, which are then magnetized, will be demagnetized quickly by contacting each other, thereby canceling each other. The magnetic particles, which have been attached to the screws by their magnetic attraction, will thus be detached from the screws, and will be carried away by the cleaning fluid that is delivered into the magnetized tube 2.

It may be appreciated from the above description that the presence of the free ferromagnetic elements, such as the screws, within the magnetized tube 2, coupled with the rotation of the magnetized tube 2, can provide the easy magnetic attraction and separation of the magnetic particles. The continuous separation operation can be performed by providing more than one separator tube.

In this embodiment, the testing was made by using the separator tube having an inner diameter of 20 cm and a length of 50 cm. To this end, raw mineral water was fed into the magnetized tube at the flow rate of 10 cm/sec., and the solenoid coil windings mounted around the magnetic tube were energized by supplying a power of 3 Kw thereto so as to produce a magnetic field of 20000 Gauss. The operation continued for 20 minutes, with the magnetized tube rotating at 20 rpm. At the end of the operation, the solenoid coil windings were de-energized to make the magnetized tube demagnetized. Then, the clean fluid was fed into the demagnetized tube, flowing reversely through the tube at the rate of 10 cm/sec. The following table 1 shows the results of the testing.

TABLE 1

Separation Test Results for Raw Mineral Water

| Class | Ionized Elements | | | | | |
|---|---|---|---|---|---|---|
| | Pb | Cu | Zn | As | Fe | Mn |
| Original Water | 0.037 | 1.2 | 1.5 | N D | 5.3 | 14.0 |
| Processed Water | 0.002 | 0.02 | 0.03 | N D | 0.4 | 0.2 |
| % of Separation | 94 | 98 | 98 | | 92 | 98 |

Date of Testing: Jun. 5, 1997

Data Offered By: Chubu Kinki Kozan Hoan Kantoku Dept.

Analysis Method: Frame Atomic Light Absorption Method

U/M: mg/liter

ND: not detected

The following table 2 presents the results of the testing that took place for mineral waste water under the same conditions, by using the same apparatus as for the preceding testing.

TABLE 2

Separation Test Results for Mineral Waste Water

| Class | Ionized Elements | | | |
|---|---|---|---|---|
| | Cd | Pb | Cu | Zn |
| Original Water | 0.098 | 0.23 | 14.0 | 32.0 |
| Processed Water | 0.006 | 0.02 | 0.28 | 1.9 |
| % of Separation | 93 | 91 | 98 | 94 |

Date of Testing: Sep. 2, 1997

Data Offered By: Chubu Kinki Kozan Hoan Kantoku Dept.

Analysis Method: Frame Atomic Light Absorption Method

U/M: mg/liter

It is clear from the above two testing results that the magnetic particles contained in the original fluid being processed can be separated very efficiently from the fluid by using the method, system and apparatus of the present invention.

Although the present invention has been described with reference to several particular preferred embodiments of the present invention by referring to the accompanying drawings, it should be understood that the present invention is not restricted to those embodiments, and various changes and modifications may be made without departing from the spirit and scope of the present invention as defined in the specification and the appended claims.

What is claimed is:

1. In an apparatus comprising a plurality of parallel tubes, each of the parallel tubes including a plurality of contiguous individual tube sections connected in series, the individual tube sections adjoining each other being separated from each other by a separator net, each of the adjoining individual tube sections separated by the separator net containing free ferromagnetic substances or elements therein and having an individual magnetic field generating coil winding mounted around the outside thereof, each of the individual magnetic field generating coil windings mounted around the outside of each corresponding individual tube section being connected to a magnetic force strength control means, each of the magnetic force strength control means connected to the respective individual tube sections being operated for controlling 1 each corresponding individual magnetic field generating coil winding so that each coil winding can apply a magnetic field of a different strength across each corresponding individual tube section, a method for separating magnetic particles mixed in a fluid, comprising the steps of:

(1) feeding an original fluid containing magnetic particles into each of the parallel tubes as an object fluid, while each of the parallel tubes is being rotated and each of the contiguous individual tube sections is placed in the magnetic field provided by energizing each corresponding individual magnetic field generating coil winding;

(2) causing the magnetic particles contained in the object fluid to be attached magnetically to the inner wall of the contiguous individual tube sections and the surfaces of the individual free ferromagnetic substances or elements therein by their respective magnetic attraction, and stopping the feeding of the object fluid before the magnetic attracting ability becomes lower below a certain value;

(3) de-energizing each of the individual magnetic field generating coil winding while the parallel tubes are being rotated, for demagnetizing the inner wall of each corresponding individual tube section and the surfaces of the individual free ferromagnetic substance or elements therein;

(4) feeding an exhaust fluid under an applied pressure into each of the parallel tubes and removing a mixture of the magnetic particles and the exhaust fluid from each. of the parallel tubes; and (5) separating the magnetic particles from the mixture fluid.

2. The method for separating magnetic particles mixed in a fluid as defined in claim 1, wherein the exhaust fluid is clean water or air, and wherein the clean water or air is fed into each of the parallel tubes in the direction opposite to that in which the object fluid is fed.

3. An apparatus for separating magnetic particles mixed in a fluid, comprising:

a machine base;

a plurality of parallel tubes arranged on the machine base so that each is capable of being rotated, each of the parallel tubes including a plurality of contiguous individual tube sections connected in series, the individual tube sections adjoining each other being separated by a separator net and each of the individual tube sections containing free ferromagnetic substances or elements therein, the free ferromagnetic substances or elements including small pieces of iron or iron alloy having a multitude of projections on the surfaces thereof and whose quantity is equal to 30% to 90% of the volume of each individual tube section;

a plurality of individual magnetic field generating coil winding each mounted around the outside of each of the contiguous individual tube sections;

a magnetic force strength control means connected to each respective one of the individual magnetic field generating coil windings and operated for controlling each corresponding individual coil winding so that each coil individual winding can apply a magnetic field of a different strength across each corresponding individual tube section;

a fluid feeding pipe means rotatably connected to each of the parallel tubes on its one end; and a fluid delivery pipe means rotatably connected to each of the parallel tubes on its other end.

4. The method for separating magnetic particles mixed in a fluid as defined in claim 1, wherein the quantity of the free ferromagnetic substances or elements contained in each individual tube section separated by separator nets is equal to 30% to 90% of the volume of said each individual tube section.

5. The method for separating magnetic particles mixed in a fluid as defined in claim 1, wherein the free ferromagnetic substances or elements are small pieces of iron or iron alloy having a multitude of projections on the surfaces thereof.

6. The apparatus for separating magnetic particles mixed in a fluid as defined in claim 3, wherein the fluid feeding pipe means on the one end of each of the parallel tubes is connected through a first valve means to a pump for feeding the object fluid into each tube, to an processed fluid reservoir for accepting the object fluid that has been returned from each tube, and to a magnetic particles reservoir for accepting a fluid including the magnetic particles that have been separated from the object fluid within each tube, and the fluid delivery pipe means on the other end of each of the parallel tubes is connected through a second valve means to a processing liquid reservoir for accepting the object fluid from which the magnetic particles have been separated, to a pressurized fluid delivery means for delivering the object fluid that remains within each tube and to the processed fluid reservoir under the applied pressure, and to a fluid delivery means for delivering the magnetic particles separated from the object fluid within each tube to the magnetic particles reservoir.

7. The method for separating magnetic particles mixed in a fluid as defined in claim 4, wherein the free ferromagnetic substances or elements are small pieces of iron or iron alloy having a multitude of projections on the surfaces thereof.

* * * * *